United States Patent [19]

Stokoe et al.

[11] Patent Number: 4,465,913
[45] Date of Patent: Aug. 14, 1984

[54] PARALLEL GAP WELDER

[75] Inventors: Philip T. Stokoe, North Attleboro, Mass.; Guy A. Gervais, Manville, R.I.

[73] Assignee: Augat Inc., Mansfield, Mass.

[21] Appl. No.: 309,049

[22] Filed: Oct. 6, 1981

[51] Int. Cl.³ .............................................. B23K 11/16
[52] U.S. Cl. ................................. 219/56.1; 219/86.25; 219/91.21
[58] Field of Search ...................... 219/56, 56.1, 56.22, 219/91.21, 91.22, 119, 86.25

[56] References Cited

U.S. PATENT DOCUMENTS

| | | | |
|---|---|---|---|
| 3,263,059 | 7/1966 | Rzant | 219/119 |
| 3,342,972 | 9/1967 | Penberg | 219/56 X |
| 3,596,044 | 7/1971 | Katzin | 219/56.1 |
| 3,627,970 | 12/1971 | Weatherman | 219/56.1 X |
| 3,692,970 | 9/1972 | Gött et al. | 219/56 |
| 3,775,579 | 11/1973 | Burghart et al. | 219/56.1 X |

Primary Examiner—Roy N. Envall, Jr.
Assistant Examiner—Catherine M. Sigda
Attorney, Agent, or Firm—Weingarten, Schurgin, Gagnebin & Hayes

[57] ABSTRACT

A welder having two generally parallel, closely spaced electrodes for manual or automatic welding of wire having displaceable insulation, for use particularly in the wiring of electronic circuit boards. The two electrodes have independent suspensions electrically isolated from one another, and have an aperture formed therebetween sufficiently large to allow a wire to pass therethrough. During the welding process, the wire is captured between the tip of one of the two electrodes and a conductive surface to which the wire is to be welded. As downward force is applied to the welder, the tip of the one electrode displaces the insulation on the wire adjacent thereto and adjacent the surface, while the other electrode tip is driven directly into electrical contact with the surface. Once sufficient force has been applied to the electrode to displace the insulation on the wire, a switch is actuated, supplying a current to the electrodes to weld the wire to the surface. The welder may be either automatically or manually operated, and may utilize either a pneumatic drive or a cable actuation system. The electrodes may be returned to an unactuated position either by a spring arrangement or by a pneumatic cylinder.

18 Claims, 15 Drawing Figures

PARALLEL GAP WELDER

FIELD OF THE INVENTION

This invention relates generally to welders and more particularly to a parallel gap welder having independently suspended electrodes.

BACKGROUND OF THE INVENTION

Welders are commonly used in the electronics industry, particularly for welding of sub-miniature components and for wiring of printed circuit boards or other types of circuit connections, for interconnecting packaging panels or circuit boards by discrete wires, or for welding of connector strips of an integrated circuit module or chip to the strip terminals of the substrate which supports the chip. Some of such known welders require that the insulation be stripped from the wire before making a welded connection while others melt the insulation to permit welding of the wire to a terminal or strip. Examples of welders which melt the insulation are shown in U.S. Pat. Nos. 3,263,059 and 3,384,958. An example of a welder in which the insulation must be previously stripped from the wire is found in U.S. Pat. No. 3,333,083. In each of the welders, one electrode is placed in contact with the wire to be welded while a second electrode is connected to the terminal or strip to which the wire is to be welded to complete the circuit. The second electrode is generally spaced from and nonparallel to the first electrode and may contact the terminal or strip at any point thereon. In U.S. Pat. No. 3,459,918, a welder is disclosed in which the electrodes are both disposed on one side of the element to be welded but in which there is no provision for removal of insulation from the wire.

None of the above described welders are capable of welding an insulated wire to a terminal or strip rapidly and in an automated fashion. An automatic soldering assembly is disclosed in U.S. Pat. No. 3,840,169, but the apparatus disclosed in this patent requires two independently controlled, non-parallel electrodes to complete the circuit to bond the wire to the circuit board, and is not suitable for automated, rapid welding procedures. An automated welder is disclosed in U.S. Pat. No. 3,278,717, but this welder has electrodes disposed on opposite sides of the elements to be welded and there is no provision for removal of insulation from the wire. When such welders having opposed, spaced electrodes are used in circuit board applications, the electrodes must be placed on opposite sides of the board. This arrangement requires the use of plated-through holes, which is not always desired. Also, such holes sometimes produce incomplete electical connections due to defects in the plating, and thus unacceptable welds can result.

SUMMARY OF THE INVENTION

Broadly speaking, this invention relates to a parallel gap welder which includes two closely spaced, generally parallel electrodes which have independent suspensions electrically isolated from one another. The electrodes depend from a housing and are both disposed on the same side of the electrically conductive workpiece to which a wire is to be welded. An aperture is provided between the electrodes through whcih an insulated wire is fed to pass beneath the tip of one of the electrodes. Wire having a displaceable insulation, such as Teflon-coated wire is preferably used. When welding the wire to the board, the electrodes are driven downwardly away from the housing and against the workpiece. The one electrode captures the wire between its tip and the workpiece, while the other electrode is driven into electrical contact with the workpiece. Continued downward pressure applied to the electrodes causes the tip of the one electrode to bear upon the wire and displace the insulation adjacent the electrode tip and adjacent the workpiece producing metal-to-metal contact between the electrode and the wire and metal-to-metal contact between the workpiece and the wire. A switch is automatically actuated to weld the wire to the workpiece when sufficient pressure has been applied to the electrodes to displace the insulation and produce a high resistance path between the workpiece and the electrode.

The welder of this invention may be held manually or may be mounted to a machine eight singly or in plurality for automated welding. In either event, the mechanism applying downward pressure to the electrodes may be cable or pneumatically actuated. Return of the electrodes to a raised position may be accomplished by return springs or by a pneumatic cylinder.

Since both electrodes are disposed on the same side of the workpiece, this invention obviates feed-through or plated-through holes and their attendant problems.

If used manually, this welder typically has an output of 100 wires an hour while if rendered semi-automatic, the output is in the vicinity of 500 wires per hour. In the semi-automatic approach, a punched-tape program positions the board on its X and Y axes, waiting until the welding has been accomplished before moving onto the next interconnection. If manually used, the operator follows a wire list in positioning the board for each weld.

DESCRIPTION OF THE DRAWING

The objects, advantages, and features of this invention will be more clearly appreciated from the following detailed description, taken in conjunction with the accompanying drawing in which.

DETAILED DESCRIPTION OF THE PREFERRED EMBODIMENTS

Figure 5:
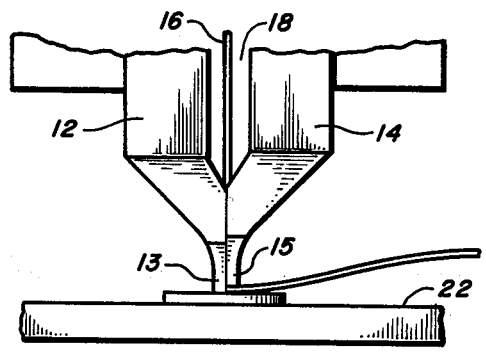
FIG. 5 is a pictorial representation of the operation of the electrodes of the welder of this invention.
Figure 9:
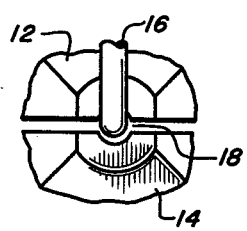
FIG. 9 is a cutaway pictorial representation of another embodiment of the configuration of the electrodes of the welder of FIG. 1.

With reference now to the drawings and more particularly to FIGS. 5 and 9 thereof, a preferred embodiment of the welder of this invention will be described. The welder includes two parallel, spaced electrodes 12 and 14, which are selectively connected to a source of current so that either one of the electrodes is negative and the other is positive. Each electrode 12 and 14 is provided with an independent suspension electrically isolated from the other suspension which maintains the electrodes in spaced, parallel relation. Electrodes 12 and 14 are permitted to ride upwardly or downwardly, as shown in FIG. 5, along an axis parallel to their direction of elongation, but not in a direction normal thereto. A gap or aperture 18 in the space between electrodes 12 and 14 is provided by recesses formed on confronting surfaces of electrodes 12 and 14 and aperture 18 has a sufficient cross sectional area to accommodate a wire 16 passing therethrough. During operation, wire 16 passes out of aperture 18 and past one tip 13 or 15 of a respective electrode 12 and 14, and electrodes 12 and 14 are driven downwardly against a workpiece 22, such as a terminal strip or contact pad disposed on printed circuit board or other electrical component board. Wire 16 is captured between tip 15, as shown in FIG. 5, of electrode 14 and workpiece 22. As force is applied to the electrodes urging them against workpiece 22, wire 16 causes the one electrode, electrode 14, to be displaced upwardly longitudinally, while the other electrode 12 is urged into electrical contact with workpiece 22. As continued force is applied to electrodes 12 and 14, tip 15 of electrode 14 displaces the insulation on wire 16 adjacent tip 15 and adjacent workpiece 22 providing metal-to-metal contact between tip 15 of electrode 14 and wire 16 and between wire 16 and workpiece 22 producing a high resistance path between tip 15 and workpiece 22. Once the insulation on the wire has been displaced, a current is applied to electrodes 12 and 14 sufficient to weld wire 16 to workpiece 22. When the welding process has been completed, tips 13 and 14 are raised from workpiece 22, additional wire 16 is fed through aperture 18 past the tip of one of the electrodes, and the welder is moved to another location where the process is repeated.

Figure 8:
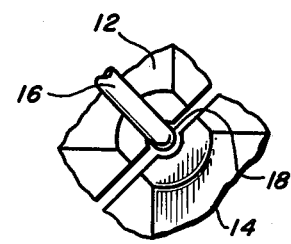
FIG. 8 is a cutaway pictorial representation of one configuration of the electrodes of the welder of FIG. 1.
Figure 10:
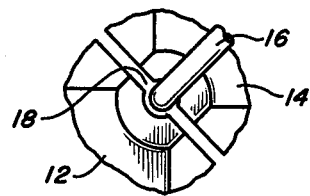
FIG. 10 is a cutaway pictorial representation of another embodiment of the configuration of the electrodes of the welder of FIG. 1.

Electrodes 12 and 14 must be spaced, as shown in FIG. 9, but they may have any orientation desired as shown by FIGS. 8-10. In FIGS. 8 and 10 aperture 18 extends at an acute angle with respect to the direction of motion of the welder while in FIG. 9, the aperture 18 extends generally normal to the direction of motion of the welder.

With reference now to FIGS. 1 through 4, 6 and 7, one specific embodiment of the welder of this invention will be described having a cable actuation system and a spring return system. This particular embodiment is especially desirable, since it is retrofittable to existing equipment. The welder housing 30 of this embodiment includes a cover plate 32, a front plate 34, two side plates 36 and a rear plate 35. Front plate 34 and rear plate 35 are secured to cover plate 32 by screws 39. A support bar 38 is secured to rear plate 35 and electrodes 12 and 14 each depend from a separate electrode holder bar 66, each of which is independently suspended from the bottom of housing 30 and electrically isolated from the other, as will be more fully described. An actuator bar 44 extends through slot 46 in one side plate 36. Bar 44 is movable downwardly toward electrodes 12 and 14 for actuation thereof and upward away from the electrodes for deactuation thereof. A switch 40 is provided along the one side plate 36 and includes switch arm 42 which permits actuation of the switch upon depression of actuator bar 44 with respect to side plate 36. Switch arm 42 is spring biased against actuator bar 44, and wheel 43 permits the end of arm 42 to ride along the upper surface of bar 44 as bar 44 moves upwardly and downwardly. Side plates 36 are slideable with respect to cover plate 32, front plate 34 and rear plate 35 to permit downward movement of the electrode suspensions, upon depression of actuator bar 44. Side plates 36 slide along assemblies 48, each of which includes a rail 49 secured to plate 34 or 35 which rides in a channel 50 formed in side plate 36.

Figure 4:
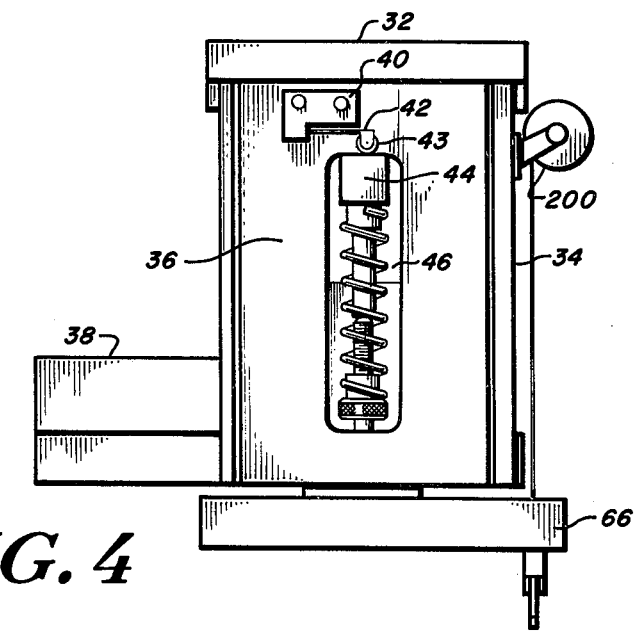
FIG. 4 is a side view of the welder of FIG. 1.

A wire spool 200 may be provided at any convenient location in the vicinity of the welder housing 30 for feeding wire to the electrodes. Typically, spool 200 is disposed on front plate 34 directly above and centered between electrodes 12 and 14, as shown in FIG. 4. Wire that is typically used in connection with this welder is 30, 32 or 34 gauge nickel wire or 30 or 34 gauge nickel-plated, copper wire. The insulation is typically Teflon.

Figure 1:
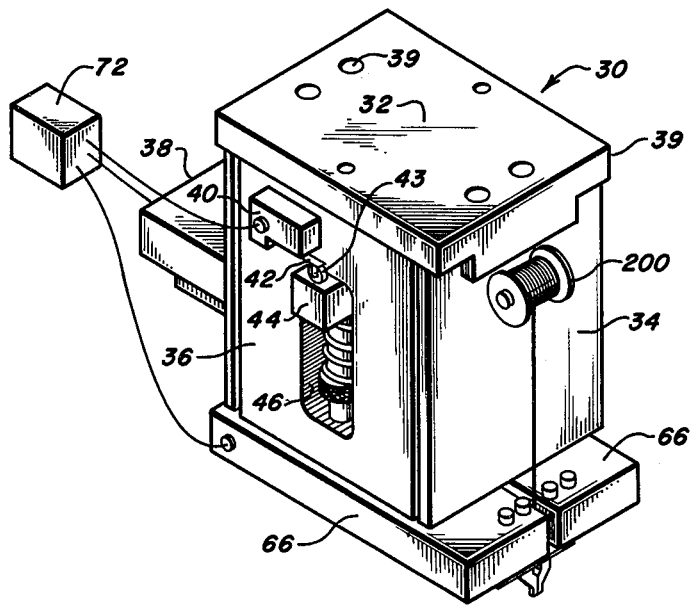
FIG. 1 is a perspective view of the welder of this invention.
Figure 2:
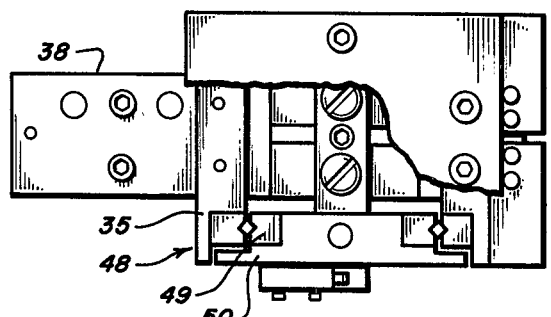
FIG. 2 is a top view of the welder of FIG. 1.

Each electrode 12 and 14 is connected to a source of power 72 as shown in FIG. 1. Switch 40 is also coupled to source 72 to interrupt the current supplied to electrodes 12 and 14 in a known manner.

Figure 3:
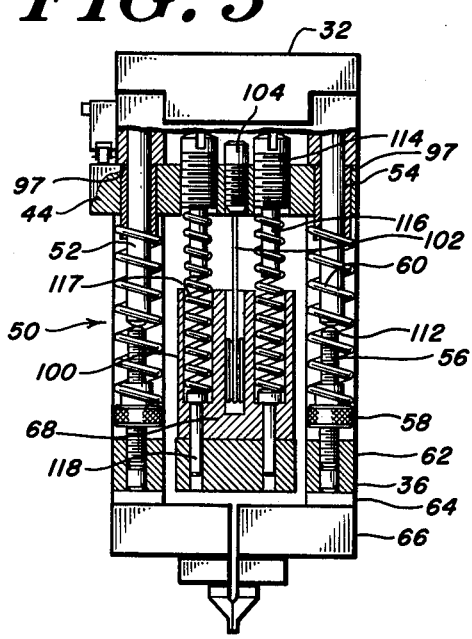
FIG. 3 is a front view of the welder of FIG. 1.
Figure 6:
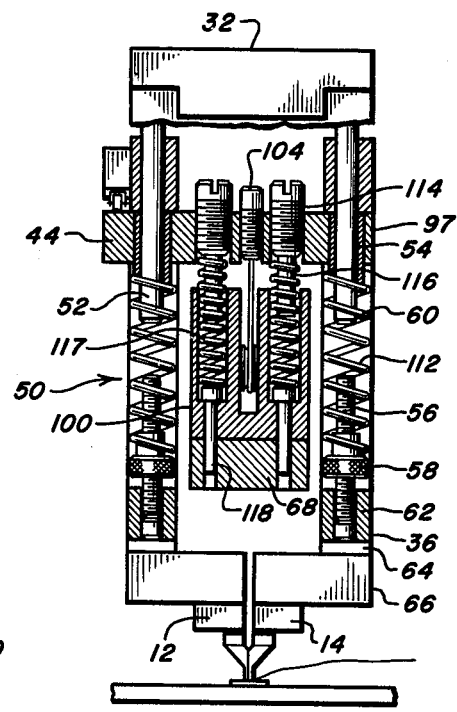
FIG. 6 is a front view of the welder of FIG. 1 in an actuated position.
Figure 7:
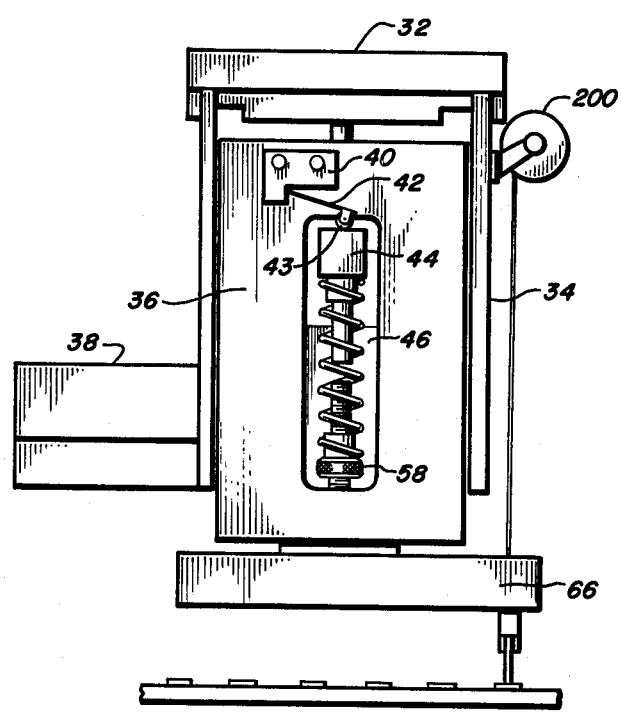
FIG. 7 is a side view of the welder of FIG. 1 in an actuated position.

With particular reference to FIGS. 3 and 7, the suspension 50 for each of the electrodes and their associated electrode holder bars 66 will be described. FIG. 3 shows the mechanism in its unactuated or raised position, while FIGS. 6 and 7 show the mechanism in its extended or actuated position. Each electrode suspension 50 includes a guide rod 52 secured to cover plate 32 and depending downwardly therefrom. Actuator bar 44 is slidably mounted at each end onto a guide rod 52 associated with each suspension 50, and sliding movement with respect to each rod 52 is facilitated by bearing 54 of actuator bar 44. Disposed directly below each guide rod 52 and axially aligned therewith is a spring adjustment stud 56 which is provided with screw threads and is mounted in block 62. A knurled knob 58 is screwed onto the threads of stud 56 and knob 58 may be moved axially along stud 56 by rotation thereof. Captured between an expanded rim of knob 58 and bearing 54 of actuator bar 44 is a compression spring 60. During the actuation or welding phase of operation, as shown in FIGS. 6 and 7, actuator bar 44 is driven downwardly along the guide rods 52 and bears against springs 60. The spacing between bearing 54 and knob 58 and thus the degree of compression of spring 60 may be adjusted by changing the axial location of knob 58 on stud 56. Knob 58 thus serves as a pressure adjustment for varying the pre-loaded downward force provided to the electrodes for different gauge wires. Each block 62 is secured to an adjacent side plate 36 and to a spacer 64. Each spacer 64 is in turn secured to an associated electrode holder bar 66. Since each electrode holder bar 66 is spring mounted to housing 30 independently of the other the holder bars 66 are electrically isolated from one another. Also, since each electrode 12 and 14 is independently secured to one of the holder bars, any upward or downward movement of one electrode does not produce comparable movement in the other electrode.

One embodiment of the return mechanism is illustrated by reference to FIG. 3. A retaining block 68 is disposed within housing 30 and is fixedly secured to support bar 38, front plate 34 and rear plate 35. Compression springs 112 extend between and bear upon actuator bar 44 and retaining block 68 to bias bar 44 upwardly away from block 68. Springs 112 are secured to block 68 by anchor screws 118 and to retainer bar 44 by spring retainers 114. Retainers 114 each have a pin or guide 116 depending downwardly therefrom which rides in channel 117 in block 68 as bar 44 is depressed downwardly. Bar 44 in turn is urged upwardly by springs 112 to bear on shoulders 97 formed on side plates 36 to bias side plates 36 and thus bars 66 and electrodes 12 and 14 upwardly when bar 44 is in the raised, non-actuated position.

Figure 11:
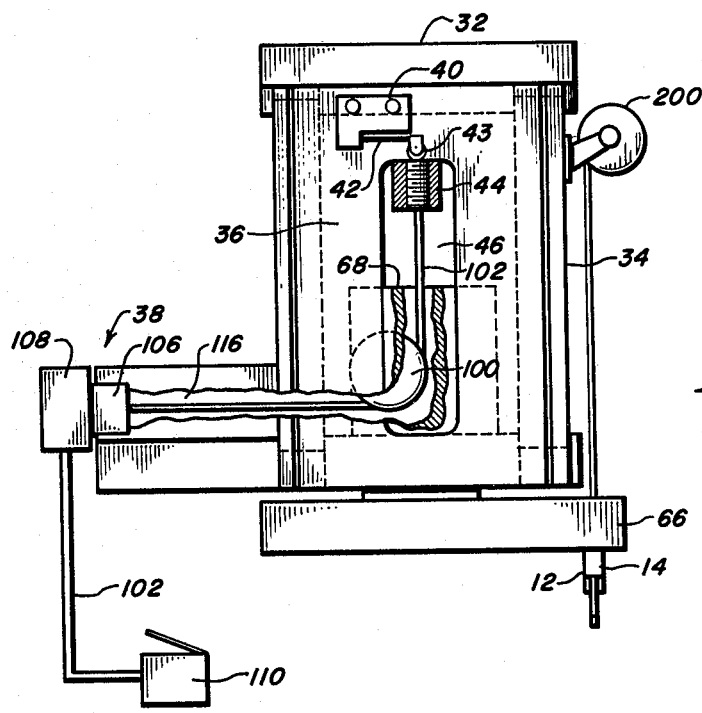
FIG. 11 is a schematic side view showing one embodiment of the actuating mechanism for the welder of FIG. 1.

One embodiment of the actuating mechanism of this invention is illustrated by reference to FIGS. 3 and 11. A cable pulley 100 is rotatably mounted in retaining block 68 about an axis normal to side plates 36. A cable 102 is secured to actuator bar 44 by an anchor 104 and passes downwardly from actuator bar 44 around pulley 100 and into a cable-retaining block 106 in support 38. Cable 102 passes through housing 108 and thence to a pedal 110 which can be actuated to retract cable 102 and to draw actuator bar 44 downwardly as pulley 100 rotates about its axis. Pedal 110 may be manually operated, by foot or by hand, to retract cable 102, or it may be automatically operated. This downward movement of actuator bar 44 exerts a downward push on springs 60, driving knob 58, side plates 36, holder bars 66 as well as electrodes 12 and 14 downwardly to the actuated position shown in FIG. 6. In the actuated position, studs 56 are spaced axially from guide rods 52, and each stud 56 and holder bar 66 combination may move upwardly and downwardly independently of the other to permit independent upward and downward movement of electrodes 12 and 14. Once electrodes 12 and 14 have engaged workpiece 22 to capture wire 16 between tip 15 of electrode 14 and workpiece 22, as shown in FIG. 5, further downward force provided to actuator bar 44 by cable 102 causes bar 44 to ride downwardly further along guide rods 52 with respect to side plates 36 and switch 40 and to compress springs 60 and springs 112 to apply additional pressure to the electrodes. Once actuator bar 44 has been driven downwardly a distance sufficient to apply the amount of force to the electrodes necessary to displace insulation on the wire, bar 44 is spaced from shoulders 97 a predetermined amount causing the end of switch arm 42, to ride downwardly a similar amount, as shown in FIG. 7. This downward pivotal movement of switch arm 42 actuates switch 40, thus sending a current to electrodes 12 and 14 to perform the welding process. Once pedal 110 is deactuated to release cable 102, spring 117 returns actuator bar 44 to its raised position. This action releases pressure from electrodes 12 and 14 and allows switch arm 42 to pivot upwardly. Actuator bar 44 again engages shoulders 97 to raise side plates 36 and consequently both electrodes and their associate bars 66 and knobs 58 into the unactuated position shown in FIG. 3.

Figure 12:
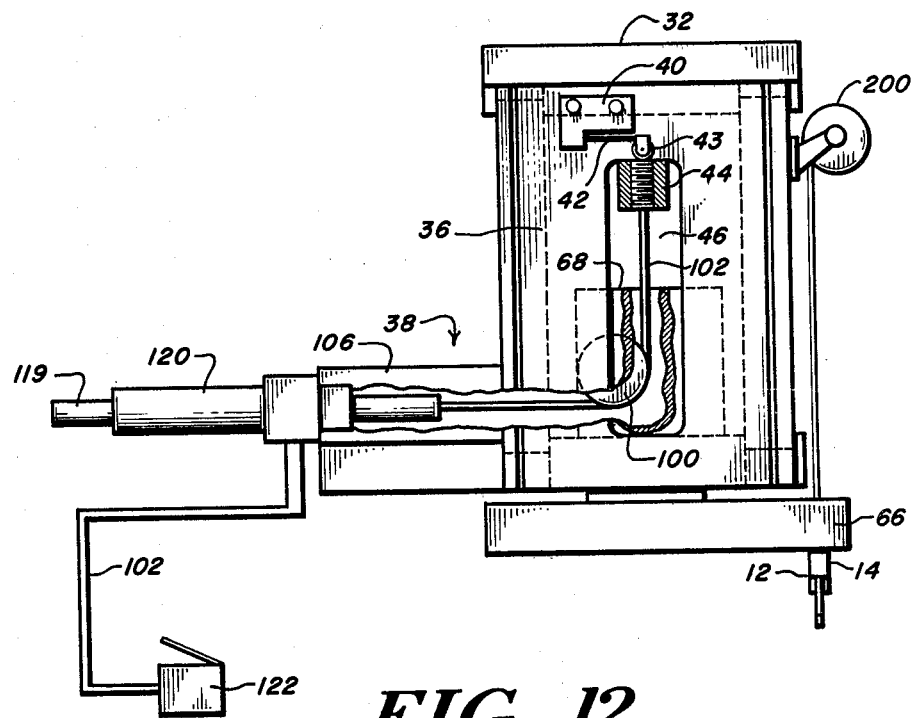
FIG. 12 is a schematic side view showing another embodiment of the actuating mechanism of the welder of FIG. 1.

Alternative embodiments of the actuating and return mechanisms will now be described with reference to FIGS. 11 through 15. A pneumatically operated actuator mechanism is shown in FIG. 12, and since this embodiment is similar to that shown and described in FIG. 11, like numbers will be used for like parts where possible. As in FIG. 11, a cable 102 is secured to actuator bar 44 by anchor 104 and cable 102 passes around pulley 100 to cable retaining block 106. In this embodiment, cable retaining block 106 is provided with a pneumatically actuated cylinder 120, and cylinder 120 is connected to a pneumatic actuator pedal 122. To drive actuator bar 44 downwardly, pneumatic actuator pedal 122 is depressed, causing withdrawal of the piston within pneumatic cylinder 120 and retraction of cable 102. Actuator bar 44 and thus electrodes 12 and 14 are returned to their raised or unactuated position by return springs 112 upon release of actuator pedal 122 as previously described for FIG. 11. The rate of return of actuator bar 44 to its raised position is controllable by flow control valve 119.

Figure 13:
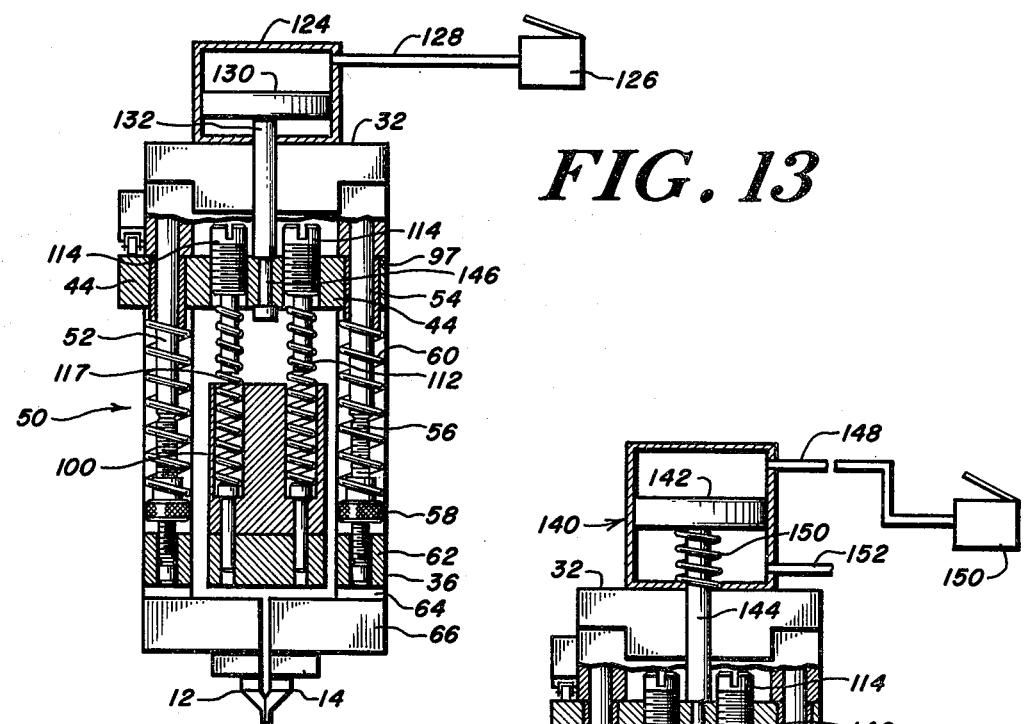
FIG. 13 is a schematic front view showing another embodiment of the actuating mechanism of the welder of FIG. 1.

Another embodiment of the actuation mechanism is shown in FIG. 13 in which the retainer bar is again pneumatically driven. Like numbers are used for like parts where possible. A pneumatic cylinder 124 is mounted onto cover plate 32 and cylinder 124 is provided with a piston 130 and a piston arm 132 which is secured to actuator bar 44 by screw 146 between spring retainers 114 in generally the same location as the cable anchor of the embodiment of FIGS. 11 and 12. A line 128 for supplying gas to cylinder 124 is coupled to pneumatic regulator pedal 126. As pedal 126 is actuated, gas is supplied to cylinder 124 through line 128, and piston 130 is driven downwardly. Actuator bar 44 is thereby driven downwardly to commence the welding process as previously described. When pedal 126 is deactuated, gases are vented from cylinder 124 through line 128, thus relieving downward pressure on piston 130 and arm 132. Actuator bar 44 is thereafter returned to its raised or unactuated position by return springs 112, as previously described for the embodiments of FIGS. 11 and 12. In all other respects, the embodiment of FIG. 13 is similar to the previously described embodiments.

Figure 14:
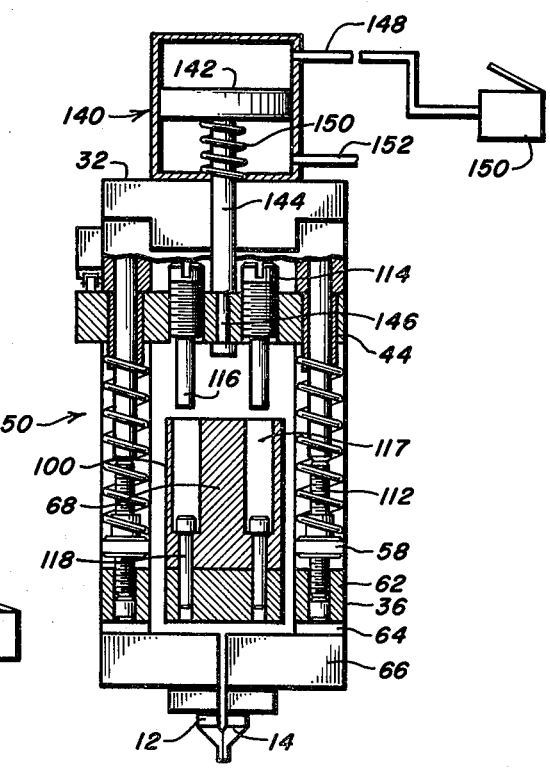
FIG. 14 is a schematic front view showing another embodiment of the actuating mechanism of the welder of FIG. 1.

A fourth embodiment of the actuation mechanism is shown in FIG. 14 in which like numbers are used for like parts where possible. A pneumatic cylinder 140 is mounted onto cover plate 32 in a manner similar to cylinder 124 of FIG. 13, and cylinder 140 is provided with a piston 142 and a piston arm 144 which extends from cylinder 140 and is secured to actuator bar 44 by screw 146 in generally the same location as piston arm 132 of FIG. 13, as shown in FIG. 14. Cylinder 140 is provided on an upper portion with a supply line 148 which is coupled to a pneumatic regulator pedal 150, and with a flow control valve 152 on a lower portion of cylinder 140. Supply line 148 and flow control valve 152 are positioned on opposite sides of piston 142 at all times. A compression spring 150 surrounds piston arm 144 within cylinder 140 and bears on an under surface of piston 142 to bias piston 142 upwardly. Spring 150 provides the return mechanism for raising cylinder 140 and retainer bar 44 upwardly upon deactuation of pedal 150. In operation, actuation of pneumatic regulator pedal 150 supplies gas to pneumatic cylinder 140 through supply line 148 to drive piston 142 and thus piston arm 144 and actuator bar 44 downwardly to commence the welding process. During actuation of pedal 150, flow control valve 152 is selectively opened in an outwardly or exhaust direction allowing air to escape from cylinder 140. Once pneumatic regulator pedal 150 is deactuated, gas is no longer supplied to cylinder 140 through line 148 and compression spring 150 raises piston 142 and thus piston arm 144 and actuator bar 44 upwardly to their unactuated position. During deactuation, flow control valve 152 is selectively opened in an inwardly, or intake direction allowing air to enter cylinder 140 below piston 142. No cable 102, reel 100 or cable anchor 104 is provided in this embodiment, and pins 116 serve to guide the movement of actuator bar 44 upwardly and downwardly in channels 117 with respect to retaining block 68. In all other respects, the operation of this embodiment is identical to previously described embodiments.

Figure 15:
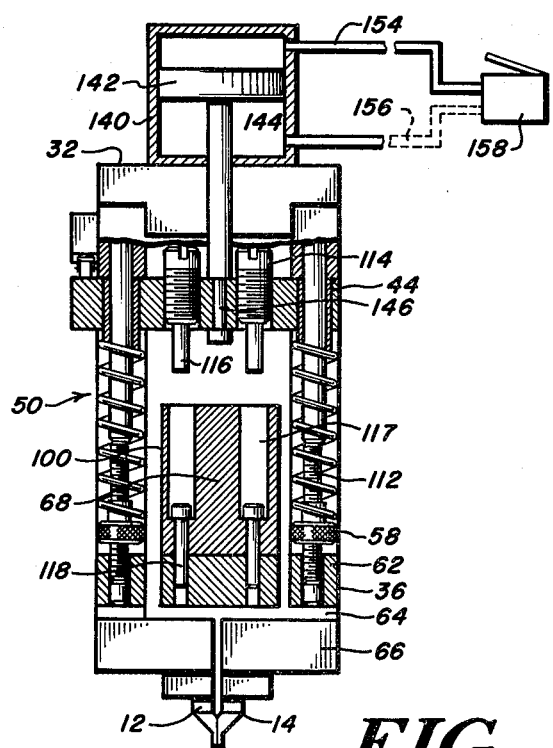
FIG. 15 is a front schematic view showing another embodiment of the actuating mechanism of the welder of FIG. 1.

Two more embodiments of the actuation mechanism of this invention are represented by FIG. 15. These last two embodiments are similar to the embodiment of FIG. 14 except that no spring 150 is provided, and like numbers are used for like parts where possible. Cylinder 140 is again provided with a piston 142 and a piston arm 144 which is secured to actuator bar 44. In one variation, line 154 extends from an upper end of cylinder 146 to pneumatic regulator pedal 158 which selectively couples line 154 to a gas supply and a gas exhaust. Line 156 is connected to a lower end of cylinder 140 and serves as a regulated exhaust which allows air to be selectively exhausted from cylinder 140 as gas is supplied thereto by line 154 and selectively drawn into cylinder 140 when line 154 is coupled to a gas exhaust. In operation, as pedal 158 is actuated, line 154 is coupled to gas supply and line 156 serves as an exhaust. Piston 142, piston arm 144 and actuator bar 44 are thereby driven downwardly. As pedal 158 is deactuated, line 154 is coupled to an exhaust, creating a negative pressure above piston 152 within cylinder 140, and drawing piston 142 upwardly. In this phase, line 156 permits air to enter cylinder 140 below piston 142, to facilitate the return of piston 142 to its raised position.

In another embodiment represented by FIG. 15, lines 154 and 156 are both connected to pneumatic regulator pedal 158 and are each selectively coupled to a gas supply. In addition, lines 154 and 156 are both provided with a selective exhaust permitting gas to be vented through one of lines 154 and 156 as gas is supplied through the other of lines 154 and 156. As pedal 158 is actuated, gas is supplied to cylinder 140 through line 154 while line 156 serves as an exhaust. Piston 142 and actuator bar 44 are driven downwardly initiating the welding cycle. As pedal 158 is deactuated, gas is supplied to cylinder 140 through line 156 while line 154 serves as an exhaust to raise piston 142 to its unactuated position. In all other respects, the operation of the embodiments represented by FIG. 15 are identical to that of FIG. 14.

The welder of this invention may be used either individually or in plurality for large scale welding of wires in a printed circuit board assembly process. The welder, if used in a single or hand-held position, is typically manually actuated utilizing the cable actuation mechanism of FIGS. 3 and 11, while if the welder is used in a large assembly process, it is semi-automatic and utilizes one of the actuation mechanisms of FIGS. 12-15. In a manual approach, the operator follows a wire list in positioning the board for each weld. In the semi-automatic approach, a punched-tape program positions the board on its X and Y axes, waiting until the operator has used the actuating pedal before moving onto the next interconnection. For a manual machine, the output is typically in the range of 100 wires per hour, while the semi-automatic machine will produce 500 wires per hour.

In the printed circuit board assembly process, since both electrodes are disposed on the same side of the board, boards with plated-through holes are no longer needed. This invention therefore overcomes the problems associated with such plated-through holes such as incomplete electrical connections or defects in the holes themselves. Typically, the bond strength of a weld produced by this machine is 85% of the ultimate tensile strength, varying only plus or minus 5%. Average heat generated during the bonding process is low, and has no effect on the laminate or solder plating which acts as a heat sink and minimizes the heating effect and changes in the resistance caused by the welding. The wire during the welding process is slightly flattened for increased surface area and a high current pulse is provided. Power source 72 is typically a capacitive discharge power supply known in the art which can provide the desired high current pulse. One example is a Unitech-Unibond parallel-gap welding power supply as produced by Augat Inc.

The above description is exemplary, and modifications and improvements are intended to fall within the scope of this invention as defined solely in the following claims.

What is claimed is:

1. A welder for use with a conductive workpiece, comprising:
   a housing having a support;
   a first electrode having a first tip;
   first means for mounting the first electrode to the housing for linear motion relative to said support along a first axis;
   a second electrode having a second tip;
   second means for mounting the second electrode to the housing for linear motion relative to said support along a second axis different from said first axis;
   third means mounted to the housing for controllably introducing insulated wire around at least a portion of said first tip;
   fourth means for driving said first electrode along said first axis to a first position on one side of the workpiece where the insulated wire around a portion of said first tip contacts the workpiece and for driving said second electrode along said second axis to a second position on the same side of the workpiece where said second tip mechanically and electrically contacts said workpiece; and
   fifth means mounted to said housing and operative in response to said first and second electrodes being in said first and said second positions for applying electrical current to said first and second electrode tips for welding said wire to said workpiece.

2. The welder of claim 1 wherein said first means and said second means each comprise a spring.

3. The welder of claim 1 wherein the wire passes through a predetermined aperture formed between said first and said second electrodes.

4. The welder of claim 1 wherein said driving means comprises:
   a transversely extending, longitudinally slidable bar coupled to said first and second means.

5. The welder of claim 4 further comprising means for biasing said bar upwardly away from said workpiece and for maintaining said tips of said first and said second electrodes in a return position in which they are spaced from said workpiece.

6. The welder of claim 4 or 5 wherein said driving means comprises a pneumatic cylinder.

7. The welder of claim 4 or 5 wherein said driving means comprises:
a cable secured to said bar and extending longitudinally downwardly; and
means for drawing said cable downwardly.

8. The welder of claim 7 wherein said drawing means comprises a pneumatic cylinder.

9. The welder of claim 5 wherein said biasing means returns said first and said second electrodes to said return position after the wire is welded to said workpiece.

10. The welder of claim 5 or 9 wherein said biasing means comprises at least one spring.

11. The welder of claim 5 or 9 wherein said biasing means comprises a pneumatic cylinder.

12. The welder of claim 1 further comprising means for adjusting the force applied by said driving means.

13. The welder of claim 1 further comprising means for withdrawing said first and said second electrodes upwardly after the wire is welded to the workpiece.

14. The welder of claim 13 wherein said withdrawing means comprises a pneumatic cylinder.

15. The welder of claim 13 wherein said withdrawing means comprises at least one spring.

16. A welder comprising:
a first electrode support movable along a first linear axis;
a first electrode depending longitudinally from said first electrode support and having a tip projecting downwardly therefrom;
a second electrode support movable along a second linear axis parallel to said first axis;
a second electrode depending longitudinally from said second electrode support and having a tip projecting downwardly therefrom, said second electrode being spaced from said first electrode by a predetermined gap and being generally parallel thereto, said tip of said first electrode being adjacent to and spaced from said tip of second electrode;
a transversely extending bar operatively connected to said first and second electrode supports and movable longitudinally upwardly and downwardly along a third linear axis parallel to said first and second linear axes;

means for supplying a wire having displaceable insulation through said predetermined gap to a position beneath said tip of one of said first and said second electrodes;
means actuable for driving said bar along said third axis to urge said first and said second electrode tips along respective first and second axes against a workpiece to capture a portion of the wire between said tip of said one of said first and said second electrodes and said workpiece to displace the insulation from said wire adjacent said workpiece and adjacent said tip of said one of said first and said second electrodes and to urge said tip of the other of said first and second electrodes into electrical contact with the workpiece;
a switch actuable for providing an electric current to said tip ends of said first and said second electrodes when said bar has moved a predetermined distance along said third axis toward the workpiece to weld the wire to the workpiece; and
means for returning said bar and said first and second electrodes in a longitudinal direction along said first, second, and third axes to an unactuated position in which said tips of said first and said second electrodes are spaced from the workpiece upon deactuation of said driving means and for maintaining said bar and said first and said second electrodes in said unactuated position when said driving means is deactuated.

17. A method of welding a wire having a thin, displaceable insulation to an electrically conductive workpiece comprising the steps of:
driving first and second generally parallel electrodes toward one side of an electrically conductive workpiece to capture the wire between the tip of the second electrode and the one side of the workpiece;
applying force to the first and the second electrodes sufficient to displace the insulation from the wire adjacent the workpiece and adjacent the tip of the second electrode and to urge the tip of the first electrode into electrical contact with the workpiece;
providing electrical charge to the first and the second electrodes to weld the wire to the workpiece; and
withdrawing the first and the second electrodes from the workpiece.

18. The method of claim 17 further comprising the step of adjusting the force applied to the first and the second electrodes prior to said applying step.

* * * * *

UNITED STATES PATENT AND TRADEMARK OFFICE
CERTIFICATE OF CORRECTION

PATENT NO. : 4,465,913
DATED : August 14, 1984
INVENTOR(S) : Philip T. Stokoe et al It is certified that error appears in the above—identified patent and that said Letters Patent is hereby corrected as shown below:

Column 1, line 64, "whcih" should read --which--.

Column 2, line 17, "eight" should read --either--.

Column 3, line 32, "12 and 14" (first occurrence) should read --12 or 14--.

Cancel claims 17 and 18.

On the title page, "18 Claims" should read -- 16 Claims --.

Signed and Sealed this

Twenty-first Day of May 1985

[SEAL]

Attest:

DONALD J. QUIGG

Attesting Officer    Acting Commissioner of Patents and Trademarks